United States Patent [19]
Teodorczyk

[11] Patent Number: 5,847,058
[45] Date of Patent: *Dec. 8, 1998

[54] ALKYLRESORCINOL MODIFIED PHENOL-ALDEHYDE RESOL RESIN AND BINDER SYSTEM, AND METHOD OF MAKING SAME

[75] Inventor: Zygmunt Teodorczyk, Palo Alto, Calif.

[73] Assignee: Masonite Corporation, Chicago, Ill.

[ * ] Notice: The term of this patent shall not extend beyond the expiration date of Pat. Nos. 5,646,219 and 5,637,658.

[21] Appl. No.: 628,865

[22] Filed: Apr. 5, 1996

[51] Int. Cl.$^6$ ..................... C08G 8/24
[52] U.S. Cl. ............. 525/480; 525/491; 525/495; 525/497; 525/524; 528/129; 528/142; 528/147; 528/155; 528/156; 528/162; 528/153; 428/524; 428/528; 264/6; 264/241
[58] Field of Search ................... 525/480, 524, 525/491, 495, 497; 428/524, 528; 264/6, 241; 528/129, 142, 153, 147, 155, 156, 162

[56] References Cited

U.S. PATENT DOCUMENTS

| | | | |
|---|---|---|---|
| Re. 26,881 | 5/1970 | Kreibich et al. | 260/52 |
| 2,471,631 | 5/1949 | Lebach | 260/43 |
| 2,489,336 | 11/1949 | Spahr et al. | 260/54 |
| 2,614,096 | 10/1952 | Spahr | 260/54 |
| 3,328,354 | 6/1967 | Dietrick | 260/54 |
| 3,389,125 | 6/1968 | Dietrick et al. | 260/54 |
| 3,422,068 | 1/1969 | Kreibich et al. | 260/52 |
| 3,476,706 | 11/1969 | Bornstein | 260/54 |
| 3,492,263 | 1/1970 | Kreibich et al. | 260/38 |
| 3,502,610 | 3/1970 | Thompson | 260/38 |
| 3,634,276 | 1/1972 | Kreibich et al. | 252/182 |
| 3,663,720 | 5/1972 | Thompson | 117/70 R |
| 3,706,619 | 12/1972 | Freeman | 156/315 |
| 3,872,051 | 3/1975 | Tiedeman et al. | 260/38 |
| 3,878,021 | 4/1975 | Tiedeman | 156/331 |
| 3,880,694 | 4/1975 | Freeman et al. | 156/331 |
| 3,896,081 | 7/1975 | Baxter et al. | 260/47 R |
| 3,919,151 | 11/1975 | Moult et al. | 260/29.3 |
| 3,920,613 | 11/1975 | Freeman et al. | 260/67.6 R |
| 3,947,425 | 3/1976 | Freeman et al. | 260/51.5 |
| 3,963,652 | 6/1976 | Tanimura et al. | 260/3 |
| 4,007,233 | 2/1977 | Kako et al. | 260/845 |
| 4,053,447 | 10/1977 | Shea | 260/38 |
| 4,061,620 | 12/1977 | Gillern | 260/29.3 |
| 4,076,873 | 2/1978 | Shea | 428/35 |
| 4,107,127 | 8/1978 | Shea | 260/38 |
| 4,167,540 | 9/1979 | Giller et al. | 525/135 |
| 4,238,379 | 12/1980 | Reinhart, Jr. | 260/29.3 |
| 4,257,926 | 3/1981 | Tanimura et al. | 260/3 |
| 4,275,170 | 6/1981 | McAllister et al. | 521/103 |
| 4,309,527 | 1/1982 | McAllister et al. | 528/138 |
| 4,373,062 | 2/1983 | Brown | 524/841 |
| 4,376,854 | 3/1983 | Yamaguchi et al. | 528/137 |
| 4,403,066 | 9/1983 | Brode et al. | 524/876 |
| 4,409,361 | 10/1983 | McAllister et al. | 524/876 |
| 4,424,238 | 1/1984 | Yotsumoto et al. | 427/381 |
| 4,425,178 | 1/1984 | Grendon | 156/307.3 |
| 4,430,473 | 2/1984 | Brode et al. | 524/492 |
| 4,433,119 | 2/1984 | Brode et al. | 525/442 |
| 4,433,129 | 2/1984 | Brode et al. | 528/154 |
| 4,471,089 | 9/1984 | McAllister et al. | 524/847 |
| 4,514,462 | 4/1985 | Brooker | 428/285 |
| 4,608,408 | 8/1986 | Hood et al. | 524/15 |
| 4,820,576 | 4/1989 | Duryea | 428/246 |
| 4,889,891 | 12/1989 | Durairaj et al. | 525/139 |
| 5,034,497 | 7/1991 | Waitkus | 528/129 |
| 5,075,413 | 12/1991 | Dailey, Jr. | 528/129 |
| 5,075,414 | 12/1991 | Dailey, Jr. | 528/129 |
| 5,075,415 | 12/1991 | Yotsumoto et al. | 528/149 |
| 5,637,658 | 6/1997 | Teodorczyk | 525/524 |
| 5,646,219 | 7/1997 | Teodorczyk | 525/524 |

FOREIGN PATENT DOCUMENTS

| | | |
|---|---|---|
| 298704 | 1/1989 | European Pat. Off. . |
| 456816 | 2/1975 | U.S.S.R. . |
| 483419 | 4/1976 | U.S.S.R. . |
| 516704 | 10/1977 | U.S.S.R. . |
| 1470750 | 4/1989 | U.S.S.R. . |
| 1295829 | 11/1972 | United Kingdom . |
| 1496703 | 12/1977 | United Kingdom . |
| 2040971 | 9/1980 | United Kingdom . |
| 1593933 | 7/1981 | United Kingdom . |
| 2100274 | 12/1982 | United Kingdom . |

OTHER PUBLICATIONS

A Pizzi, "Phenolic Resin Wood Adhesives", pp. 160–173.
P. Christjanson, "Development of Alkylresorcinol (AR) Resin Adhesives: Chemistry of AR Resins," Proceedings from the Adhesives and Bonded Wood Symposium, Nov. 19–21, 1991, pp. 267–277.
Chemical Abstracts 69:436679, "Water Soluble Phenol Formaldehyde Resins", Zabrodkin et al., 1967.

*Primary Examiner*—Frederick Krass
*Attorney, Agent, or Firm*—Marshall, O'Toole, Gerstein, Murray & Borun

[57] ABSTRACT

A process for the production of a storage-stable, modified phenol-aldehyde resol resin includes the use of an alkylresorcinol modifier and preferably a readily-available mixture of alkylresorcinols. A binder system includes the modified phenol-aldehyde resin combined with a curing agent that includes an additional source of an aldehyde, e.g., a phenol-formaldehyde resin. The resin and binder system are useful in the production of a wood composite (such as plywood, oriented strandboard, or fiberboard).

29 Claims, No Drawings

5,847,058

ALKYLRESORCINOL MODIFIED PHENOL-ALDEHYDE RESOL RESIN AND BINDER SYSTEM, AND METHOD OF MAKING SAME

CROSS REFERENCE TO RELATED APPLICATIONS

This application relates to subject matter similar in some respects to that disclosed in commonly-assigned U.S. application Ser. No. 08/447,839 filed May 23, 1995, now U.S. Pat. No. 5,637,658 issued Jun. 10, 1997, which is a continuation of U.S. application Ser. No. 08/107,522 filed Aug. 17, 1993, now abandoned, and its divisional U.S. Pat. No. 5,646,219 issued on Jul. 8, 1997, the respective disclosures of which are hereby incorporated herein by reference.

BACKGROUND OF THE INVENTION

1. Field of the Invention

The invention relates generally to the production of modified phenol-aldehyde resins, and more particularly to the preparation and use of modified phenol-aldehyde resol resins which utilize an additional source of aldehyde, e.g., a phenol-formaldehyde resin, as a curing agent. The invention further relates to the use of such a cured resin as a binder in a process for the production of cellulosic composites, e.g., fiberboard, waferboard, or plywood.

2. Description of Related Technology

Various processes may be used to produce cellulosic or wood composites. The selection of a particular process depends upon the desired final product. Synthetic resins, such as phenol-formaldehyde resins, are often used as binders in the manufacture of cellulosic or wood composites, such as man-made pressed wood boards, for example: (a) fiberboards such as hardboard, softboard, and medium density fiberboard ("MDF") and (b) chipboards such as waferboard, particleboard, and oriented strandboard ("OSB"). Composites of these materials are also useful. The materials can be used to produce boards, siding materials, doorskins, and other structural or building products, for example.

Fiberboard, for example, may be made by various known processes including "dry" processes, "wet" processes, or "wet-dry" processes. Generally, in a wet process, cellulosic fillers or fibers (e.g., woody material that is subjected to fiberization to form wood fibers) are blended in a vessel with large amounts of water to form a slurry. The slurry preferably has sufficient water content to suspend a majority of the wood fibers and preferably has a water content of at least 90 percent by weight ("weight percent"). The slurry is deposited along with a synthetic resin binder, such as a phenol-formaldehyde resin, onto a water-pervious support member, such as a fine screen or a Fourdrinier wire, where much of the water is removed to leave a wet mat of cellulosic material having, for example, a moisture content of about fifty percent, based on the weight of dry cellulosic material. The wet mat is transferred to a press and consolidated under heat and pressure to form the molded wood composite.

A wet-dry forming process can also be used to produce wood composites. Preferably, a wet-dry process begins by blending cellulosic or wood fiber material in a vessel with large amounts of water to form a slurry. This slurry is then blended with the resin binder. The blend is then deposited onto a water-pervious support member, where a large percentage (e.g., 50 percent or more) of the water is removed, thereby leaving a wet mat of cellulosic material having a water content of about 40 wt.% to about 60 wt.%, for example. This wet mat is then transferred to a zone where much of the remaining water is removed by evaporation. The dried mat preferably has a moisture content of less than about 10 wt.%. The dried mat is then transferred to a press and consolidated under heat and pressure to form the wood composite, which may be a flat board or a doorskin article, for example. The product can have many other shapes depending on the intended use of the product.

In a dry process, the cellulosic fibers are generally conveyed in a gaseous stream or by mechanical means, rather than by a liquid (water) stream. Cellulosic fibers supplied from a fiberizing apparatus (e.g., a pressurized refiner) can be first coated with a thermosetting resin binder, such as a phenol-formaldehyde resin, in a blowline blending procedure or by a blending apparatus. The resin-coated fibers from the blowline can then be randomly formed into a mat by air blowing the fibers onto a support member. The fibers, either before or after formation of the mat, can optionally be subjected to pre-press drying, e.g., in a tube-type dryer. The mat, typically having a moisture content of less than 30 wt.% and preferably less than 10 wt.%, is then pressed under heat and pressure to cure the thermosetting resin and to compress the mat into an integral consolidated structure.

Various known phenol-formaldehyde resins may also be utilized as binders in the manufacture of other wood composites such as plywood.

Several useful processes are described (for example, for the production of plywood and fiberboard) in U.S. Pat. No. 4,961,795, the disclosure of which is hereby incorporated herein by reference.

Various fast-curing phenol-formaldehyde resins have been utilized as binders in the manufacture of wood composites. Typical fast curing phenol-formaldehyde resins have (a) a high molar ratio of formaldehyde to phenol and (b) a high caustic content in order to accelerate the curing process. However, such fast-curing resins are undesirable due to (a) high levels of free formaldehyde emission during pressing and (b) the high caustic content which negatively impacts the resistance of the final product to moisture.

It is therefore desirable to produce a binder resin which (a) has a relatively fast cure time, (b) is stable for storage at room temperature, and (c) is resistant to high levels of moisture. In addition, it is desirable to produce a binder system in which undesirable amounts of formaldehyde will not be released into the atmosphere upon pressing. It is further desirable to produce a binder system which is convenient to use in a process such as the those described above. It is still further desirable to produce a modified phenolic resin and binder system economically for use on a commercial scale.

SUMMARY OF THE INVENTION

It is an object of the invention to overcome one or more of the problems described above.

Accordingly, the invention provides a process for producing a modified phenol-aldehyde resol resin (e.g., a phenol-formaldehyde resin) useful in the production of wood composites, e.g., fiberboard and waferboard. The resin is modified with at least one alkylresorcinol compound. The alkylresorcinol is most preferably supplied from a by-product mixture resulting from the processing of oil shale, as described in greater detail below.

According to one feature of the invention, the inventive modified phenol-aldehyde resin is combined with a source of aldehyde (e.g., formaldehyde or a formaldehyde derivative) to form a binder system. In a preferred embodiment of the invention, a binder system is provided by supplying the modified phenol-aldehyde resin in combination with a curing agent which is an organic resin comprising formaldehyde.

In a further embodiment of the invention, the modified phenol-aldehyde resol resin is combined with a curing agent and cellulosic material (e.g., wood wafers or fibers) to form a mat. The mat is cured under heat and pressure to form a wood composite. Alternatively, the inventive resin may be utilized as a binder in the manufacture of plywood.

The invention provides a phenol-alkylresorcinol-formaldehyde resin of the resol type having a molar ratio of formaldehyde to total phenolics of greater than one, and that is very storage stable and reactive with a source of additional formaldehyde as a curing agent.

Other objects and advantages of the invention will be apparent to those skilled in the art from the following detailed description, taken in conjunction with the appended claims.

DETAILED DESCRIPTION OF PREFERRED EMBODIMENTS

According to the invention, a modified phenol-aldehyde resol resin is produced by first condensing in a methylolation reaction a phenolic compound and an aldehyde in the presence of an alkaline catalyst. The condensation product of the phenolic compound and the aldehyde is then further condensed with a modifier comprising at least one alkylresorcinol compound. The resin produced thereby may be incorporated with a curing agent which provides a further source of aldehyde (e.g., a phenol-formaldehyde resin). The combination of the inventive resin and curing agent may comprise a binder system which is blended with a cellulosic material (e.g., wood wafers or fibers) and formed into a wood composite, e.g., waferboard, fiberboard, or particleboard. The binder system can also be used in the production of plywood.

The reference herein to "phenol" or "phenolic compound" denotes not only phenol itself (i.e., hydroxybenzene), but phenol derivatives as well. Although phenol itself is preferably utilized in order to produce a resin which can be made economically on a commercial scale, many other compounds are useful as the phenol or phenol derivative of the present invention. Such useful phenols include substituted phenols such as cresols and xylenols. Therefore, it is understood that when the phenol component of the resin is referred to herein, this refers to both phenol itself and phenol derivatives.

The phenolic component used in accordance with the invention can include a difunctional phenolic compound. The term "difunctional phenolic compound" is used to refer to phenolic molecules which are capable of reacting with no more than two molecules of formaldehyde. The hydroxyl group of phenolic compounds generates reactivity of the carbon positions which are ortho and para to the hydroxyl group, therefore, examples of difunctional compounds include: o-cresol, p-cresol, p-tertbutylphenol, p-nonylphenol, p-dodecylphenol, difunctional xylenols (i.e., excluding 3,5-xylenol), and mixtures of these compounds. O-cresol is a preferred compound due to its low cost and availability. A mixture of cresols, phenol, and xylenols can also be used; this mixture (called cresylic acid) is also particularly useful on a commercial scale due to its relatively low cost.

The "formaldehyde component" of the inventive resin is not limited to formaldehyde itself, but encompasses any formaldehyde derivative and other aldehydes or derivatives thereof which are known in the art to be useful in conjunction with phenol-formaldehyde resins. For example, the following aldehydes are useful as the formaldehyde component of the invention: acetaldehyde, glyoxal, furaldehyde, paraformaldehyde, and glyoxal. However, formaldehyde is the preferred aldehyde. A source of formaldehyde is preferably used as the aldehyde component of the inventive resin. Most preferably, a formalin solution containing either 37 or 50 weight percent formaldehyde in water is utilized. Thus, it is understood that when the formaldehyde component of the resin is referred to herein, this refers to formaldehyde, other aldehydes, formaldehyde derivatives, and hexamethylaminetetramine.

According to a preferred embodiment of the inventive method, formaldehyde (or a formaldehyde derivative or other aldehyde) and phenol (or a phenol derivative) are condensed, preferably at a temperature of about 65° C. to about 70° C., in a reactor in the presence of an alkaline catalyst, e.g. caustic, to achieve methylolation of phenol. Useful catalysts include those known in the art, for example, sodium hydroxide or potassium hydroxide.

The molar ratio of aldehyde to phenol in the aforementioned methylolation reaction is preferably in the range of about 1.2 to about 2.2 moles of aldehyde per mole of phenol, more preferably about 1.3 to about 1.6 moles aldehyde per mole phenol, and most preferably about 1.4 moles aldehyde per mole phenol.

Although higher levels of caustic may be utilized (especially for plywood applications), caustic is preferably added to the reaction mixture at about 0.1 to about 0.2 moles sodium hydroxide per mole of phenol. Such an amount of caustic preferably assures very beneficial wet properties of wood composites (e.g., tolerance to moisture), while allowing for sufficiently rapid cure. More caustic can be used to accelerate the resin cure process; however, in some cases a high caustic content may result in undesirable properties in the final product, including higher water absorption rates and thickness swell of the final wood composite product. For plywood applications, the molar ratio of caustic to phenol is preferably in the range of about 0.7:1 to about 0.3:1.

Following the condensation reaction between the phenolic compound and an aldehyde, the reactor is preferably heated to an elevated temperature (preferably in the range of about 85° C. to about 95° C., e.g., about 90° C.) and held at this temperature until a polymer of desired chain length is produced. The temperature of the reaction should be carefully controlled in order to prevent overheating. (The mixture could alternatively be cooked at a higher temperature approaching 100° C. and then cooled down shortly before the end point of the reaction.) The desired chain length of the polymer, which varies depending upon the reactants and reaction conditions, in practice will be based on a measurement of the viscosity of the condensation product. This initial condensation product may be referred to as a "PF pre-polymer" or phenolic resin.

To this initial condensation product will be added an amount of a modifier comprising at least one alkylresorcinol compound, preferably without the addition of further caustic. The reaction is then allowed to continue until a desired chain length (again, measured as a function of viscosity) is reached to produce what may be referred to as a phenol alkylresorcinol formaldehyde resin, referred to as a "PARF pre-polymer" or "PARF resin." The inventive resin is also referred to herein as an alkylresorcinol-modified phenol-formaldehyde resin.

There are many different alkylresorcinol compounds that can serve as the modifier of the invention. Examples of useful alkylresorcinol compounds include resorcinol substituted with the lower alkyls, e.g., ethyl, methyl, and/or propyl. The alkylresorcinol modifier may be a mixture of alkylresorcinol compounds, and can contain various impurities without negatively affecting the resin.

Most preferably, the alkylresorcinol source is a raw material by-product resulting from the processing of Baltic oil shale (kukersite), for example in Estonia. This raw material, a mixture of several components, is available from the RAS Kiviter company of Kohtla Järve, Estonia, and is referred to as "Total Shale Phenols" by the supplier.

The preferred raw material can be purified by known vacuum distillation techniques to form four main fractions: (1) a fraction of monohydric phenols; (2) a fraction comprising a mixture of alkylresorcinols, referred to as "Alkyres" by the supplier; (3) a fraction including mainly 5-methylresorcinol; and (4) an asphaltous substance. Any of (A) the raw material ("Total Shale Phenols"), (B) the "Alkyres" fraction (fraction 2 above), and/or (C) the 5-methylresorcinol fraction (fraction 3 above) can be used as the alkylresorcinol modifier of the invention.

Since the aforementioned mixtures are relatively complex, each of the compounds present in the raw material has not yet been fully identified. According to the supplier's material data safety sheet (and attached sheet describing "TOTAL SHALE PHENOLS"), the disclosures of which are hereby incorporated herein by reference, the "Total Shale Phenols" have on average a molecular weight of about 150 to 160, and "Alkyres" about 130. The "Alkyres" mixture contains about 45 to about 55 weight percent 5-methylresorcinol. Table I below shows generally the composition of the "Total Shale Phenols." Table II shows the typical chemical composition of the "Total Shale Phenols," as determined by gas chromatography.

TABLE I

| Component | Weight Percent |
| --- | --- |
| Phenols | minimum 94.5 |
| Neutral oils | maximum 2.5 |
| Water | maximum 2.5 |
| Ash | maximum 0.06 |

TABLE II

"TOTAL SHALE PHENOLS"

| Component | Weight Percent |
| --- | --- |
| Monohydric Phenols (including Xylenols) | 8.8–12.2 |
| Xylenols | 0.8–1.2 |
| Resorcinol | 0.5–2.0 |
| 2-Methylresorcinol | 0.5–1.5 |
| 4-Methylresorcinol | 1.5–2.5 |
| 5-Methylresorcinol | 28–32 |
| 2,5-Dimethylresorcinol | 5–7 |
| 5-Ethylresorcinol | 11–13 |
| 4,5-Dimethylresorcinol | 5–8 |
| Unidentified Compounds | 19–25 |

Table III below illustrates typical ranges of components of the "Alkyres" mixture present in the "Total Shale Phenols."

TABLE III

"ALKYRES"

| Component | Weight Percent |
| --- | --- |
| Monohydric Phenols | 1 |
| Resorcinol | 1.5–2 |
| 2-Methylresorcinol | 1–1.5 |
| 4-Methylresorcinol | 2–4 |
| 5-Methylresorcinol | 45–55 |
| 2,5-Dimethylresorcinol | 14–16 |
| 4,5-Dimethylresorcinol | 6–7 |
| 5-Ethylresorcinol | 3–8 |
| 5-Propylresorcinol | 1 |
| Other resorcinol derivatives | 12–18 |

Thus, when using the aforementioned Total Shale Phenols, or a similar mixture, as the source of the alkylresorcinol modifier, exact molecular weights and molar amounts may sometimes not be known. Therefore, approximate amounts according to the molar ratios disclosed herein may have to be used.

The above-described sequential condensation reactions preferably use a molar ratio of phenol to alkylresorcinol of about 1 to about 10 moles phenol per mole alkylresorcinol, and more preferably about 5 to about 10 moles phenol per mole alkylresorcinol.

The molar ratio of formaldehyde to total phenolic compounds (i.e., phenol plus alkylresorcinol) is preferably about 1:1 or greater. More preferably, the ratio is in the range of about 1 to about 1.8 moles formaldehyde per mole phenolics, and most preferably about 1.1 to about 1.4 moles formaldehyde per mole phenolics. For many applications, the ratio of formaldehyde to total phenolics is preferred to be about 1.2 moles formaldehyde per mole phenolics. However, one advantage of the invention is that this molar ratio can be varied to provide resins with varying properties depending upon the intended application of the resin.

The amount of formaldehyde is preferably in the range of about 25 to about 50 percent based on the weight of total phenolic content (based on solids), and more preferably in the range of about 30 to about 38 weight percent based on solids.

Following the condensation of alkylresorcinol to produce the "PARF pre-polymer" or "PARF resin," the reactor is cooled to ambient temperature for storage. The product resin, which may be referred to as a "PARF resin," is generally stable at ambient temperature for at least one month. The inventive resin can be used as a binder in the manufacture, for example, of waferboard, fiberboard (e.g., medium density fiberboard or hardboard), oriented strandboard, plywood, and particleboard.

A major advantage of the invention is the relative ease and low cost of obtaining alkylresorcinol components (similar to the use of lignomodified phenol-formaldehyde resins as binders), e.g., as by-products of oil shale processing. Another advantage is believed to be that, because alkyl groups are known to be water-repellant, the presence of alkyl groups provides the PARF resin with a more hydrophobic character, which is advantageous in many applications.

Using the reactants in the ratios disclosed herein will preferably facilitate curing and provide a resin with good reactivity with fast curing phenolic resins (used as curing agents, as described below). The ratios will also provide good storage stability, water miscibility, good stability when mixed with the phenolic resin, low formaldehyde emission out of presses used in manufacturing processes, and good bonding properties.

The inventive phenol alkylresorcinol formaldehyde resin produced by the above-described process may be satisfactorily utilized in any process that utilizes a conventional hot press.

Another feature of the present invention is that the inventive PARF resin can be utilized in conjunction with a curing agent, as described below. Although the resin may be cured by itself at high temperatures, the cure rate of the resin is preferably accelerated by addition to the PARF resin of a source of further formaldehyde or other aldehyde. Any source of formaldehyde or other aldehyde may be used to accelerate the cure of the PARF resin.

According to a preferred embodiment of the invention, an organic resin comprising formaldehyde (e.g., a fast-curing phenol-formaldehyde resin or a "PF resin") is utilized as the curing agent. Any organic resin comprising formaldehyde, a formaldehyde derivative, or other aldehydes may be utilized. Thus, when a phenol-formaldehyde resin is referred to herein, reference is also made to the other resins described in the preceding sentence. However, a phenol-formaldehyde resin is the preferred curing agent. When using a PF resin as the curing agent, the weight proportion of the PARF resin to PF resin is preferably about 0.25:1 to about 4:1, and more preferably about 0.6:1 to about 1.5:1. PF resins known in the art as binders in wood composites may be suitably utilized as the source of further formaldehyde. For example, a PF resin having a molar ratio of formaldehyde to phenol of about 2 to about 3 moles formaldehyde per mole phenol, and more preferably about 2.4 moles formaldehyde per mole phenol is useful with the invention. Where the source of further formaldehyde is a phenol-formaldehyde resin, the total resulting ratio of phenol to alkylresorcinol (in the complete binder system) is preferably in the range of about 5 to about 15 moles phenol per mole alkylresorcinol, and more preferably about 10 moles phenol per mole alkylresorcinol. In addition, the total molar ratio of formaldehyde to phenol in the complete binder system may be about 1.8 moles formaldehyde per mole phenol.

The use of the above-described resins as curing agents, e.g., a phenol-formaldehyde resin, is beneficial not only because the PF resin functions as a curing agent, but because the PF resin contributes on its own as a binding agent. Because the PF resin is a binding agent, this provides a further advantage in that the PF resin preferably reduces the overall cost of the binder system due to the lower cost of phenol-formaldehyde resins.

In addition to phenol-formaldehyde resins, urea-formaldehyde or melamine-formaldehyde resins may be utilized as curing agents with the invention. Alternatively (although less preferably), the curing agent may be hexamethylenetetramine or paraformaldehyde. Further, combinations of any of the above-mentioned curing agents may also be utilized.

The curing agent can be pre-mixed with the PARF and/or mixed in line during production of wood composites, for example. The stability of the PARF/PF mixture is good enough for several hours, which means that the viscosity of the mix does not change much during the first six hours of open time. However, in practice it may be most advantageous to mix the resins in line just prior to spraying the same on the wood furnish or filler. In the binder system, the inventive resin exhibits very fast cure and excellent tolerance to high levels of moisture. For example, in the production of consolidated cellulosic composites, the inventive PARF resin preferably is able to be cured while using an additional source of aldehyde in press cycles (times) not longer than those typically observed for isocyanate resins, while at the same time the inventive resin yields a substrate with better weatherability properties.

The cure speed for the two-component resin of the invention is generally governed by the reactivity of PARF resin and total molar ratio of formaldehyde to phenolics.

The PARF resin in combination with a PF resin (as a curing agent) can be easily spray-dried by a process known in the art and used as a one-component system. They may be also mixed in a separate tank before spray-drying or addition to cellulosic material. Such liquid mixture of PARF and PF curing resin is stable for several hours.

As is known in the art, a variety of other modifiers may be incorporated into the inventive resin in order to modify its properties. These modifiers include, for example: lignins, tannins, sugars, starches, glycols, polyols, and mixtures thereof. The proportion of these modifiers incorporated into the resin typically ranges from about 5 to about 35 weight percent based upon the phenolic component of the resin.

In a preferred method of the invention, phenol, formaldehyde and water are first combined in a reaction vessel. The ingredients are mixed, followed by the addition of caustic soda (NaOH) to the mixture, preferably at a temperature below about 45° C., to begin the condensation reaction. (Alternatively, the phenolic component and caustic can first be mixed, followed by the later addition of the aldehyde at a higher temperature such as about 65° C.) Because the reaction is generally highly exothermic, caustic is added slowly, preferably over a period of time of, for example, about fifteen minutes. The temperature of the reactants will immediately begin to rise, and the reaction temperature therefore should be carefully controlled. To ensure safe control of the reaction temperature, the increase in temperature can be paused at various predetermined temperature plateaus. Such a pause may be accomplished by vacuum and/or water cooling. Once the temperature begins to drop under the vacuum and/or water cooling, the temperature may then be allowed to increase.

The pH in the methylolation stage is preferably greater than 9; however, as stated above, care must be taken to control the exothermic reaction. Further, as also stated above, the amount of caustic is preferably limited so as to reduce the water sensitivity of the final resin product. The reaction preferably uses a molar ratio of caustic soda to phenolic compounds in the range of about 0.05:1 to about 0.5:1 and more preferably about 0.1:1 and 0.2:1.

The temperature of the reactants is allowed to increase stepwise until the temperature reaches about 65° C. The reaction is preferably paused at previously determined increments, for example at 50° C., 55° C., and 60° C., to avoid overheating. The temperature of the reaction is then preferably held at about 65° C. for about thirty minutes. An additional amount of caustic may next be added, preferably at a temperature below about 70° C., for example. The reaction temperature is now allowed to increase to about 85° C.; the reaction mixture is heated, if necessary, to reach this temperature. The reaction mixture is held at this temperature (about 85° C.) until the mixture reaches a viscosity of about "B"–"C", as defined by the Gardner viscosity scale. The desired viscosity and chain length are selected depending upon the reactants, the reaction conditions, and the desired characteristics of the final resin product.

Alkylresorcinol (preferably a mixture of alkylresorcinols) is added to the reactor, which is held at about 85° C. The reaction mixture need not be cooled prior to the addition of the modifier, e.g., resorcinol; such cooling is necessary in many prior art processes, for example, those processes disclosed in U.S. Pat. Nos. 2,489,336 and 2,614,096. The modifier compound(s) is preferably reacted without the addition of further caustic, followed by continuation of the reaction until a desired chain length (e.g., measured as a desired viscosity) is reached, for example about "E"–"F" on the Gardner-Holt scale. Preferably, the reaction is continued until the point where substantially all of the modifier compound(s) has been solubilized. Once the reaction mixture has reached this viscosity, the batch is cooled as rapidly as possible to about 25° C. to produce the alkylresorcinol-modified phenol-formaldehyde resin. The resin, in aqueous solution, is now suitable for pumping to storage.

The pH of the PARF pre-polymer resin solution is preferably about 9; however, for plywood applications, the pH could be much higher due to the use of greater amounts of caustic.

If the resin is to be stored as a powder, the resin can be mixed with the phenol-formaldehyde curing agent immediately prior to the spray-drying (wherein the liquid form of the resin is made into a powder form).

The resin of the invention is a resol. The total molar ratio of formaldehyde to phenolics is greater than one, and the resin can be cured by itself at high temperature. (Novolak resins require an additional source of formaldehyde for curing.) However, the cure speed of the inventive resin can optionally be increased by supplying an additional source of formaldehyde, as discussed above, to produce a very fast curing binder system.

The unexpected results of the invention include the fact that at molar ratios of formaldehyde to total phenolics (phenol plus alkylresorcinol) of greater than 1, the resulting resole resin is storage stable, curable by itself at high temperature and/or curable at lower temperatures with an additional source of formaldehyde.

Following is a description of three specific examples illustrating the benefits of the invention.

EXAMPLE I

In Example I, a resin formulation was made in accordance with the inventive method. The ingredients used in making the resin are shown in Table IV-A below.

TABLE IV-A

| Reactant | Parts By Weight | Concentration |
|---|---|---|
| Phenol | 28.53 | Pure |
| Water | 12.14 | — |
| Sodium Hydroxide | 1.82 | 50 wt. % |
| Formalin | 34.45 | 37 wt. % |
| Sodium Hydroxide | 1.82 | 50 wt. % |
| Total Shale Phenols | 14.87 | mixture |
| Water | 6.37 | — |
| TOTAL | 100.00 | |

A mixture of the phenol, the first aliquot of water and the first aliquot of sodium hydroxide catalyst was heated to about 65° C., followed by the addition of formalin over a forty minute period at about 65°–70° C. The reaction was continued at 70° C. for an additional thirty minutes after the addition of formalin was completed. The second aliquot of sodium hydroxide was then added and the temperature was increased to about 90° C. The reaction was held at about 90° C. until the viscosity of the reaction mixture reached B–C. on the Gardner-Holt viscosity scale.

When this viscosity was reached, the Total Shale Phenols were added with the second aliquot of water. The reaction was held at 90° C. until a measured viscosity of D–E was reached to form a phenol-alkylresorcinol-formaldehyde resin. The product was cooled rapidly to 25° C. for storage.

The resin produced in accordance with Example I, which has a molar ratio of formaldehyde to total phenolics of about 1.08:1, was stable at room temperature and was found to have the properties outlined in Table IV-B below.

TABLE IV-B

| Property | Value |
|---|---|
| Non-volatiles | 50 wt. % |
| Water Tolerance | 250 wt. % |
| Gel Time @ 100° C. | about 84.4 min. |
| Free Formaldehyde | about 0% |
| Final Viscosity | 145 cps |
| Viscosity after one week | 180 cps |
| Viscosity after two weeks | 200 cps |
| Viscosity after 18 days | 230 cps |

EXAMPLE II

Another resin formulation was made in accordance with the inventive method. The ingredients used in making the resin of Example II are shown in Table V-A below.

TABLE V-A

| Reactant | Parts By Weight | Concentration of Solution |
|---|---|---|
| Phenol | 30.37 | Pure |
| Water | 9.69 | — |
| Caustic (NaOH) | 1.94 | 50 wt. % |
| Formalin | 36.67 | 37 wt. % |
| Caustic (NaOH) | 1.94 | 50 wt. % |
| "Alkyres" | 13.57 | mixture |
| Water | 5.82 | — |
| TOTAL | 100.00 | |

The production of the resin of Example II is similar to that of Example I. The phenol, the first aliquot of water and the first aliquot of sodium hydroxide catalyst were heated to about 65° C., followed by the addition of the formalin over a forty minute period at about 65°–70° C. The reaction was continued at 70° C. for an additional thirty minutes after the addition of formalin was completed. The second aliquot of sodium hydroxide was then added and the temperature was increased to 95° C. The reaction was held at 95° C. until the viscosity of the reaction mixture reached B–C on the Gardner-Holt viscosity scale.

When this viscosity was reached, the "Alkyres" was added along with the second aliquot of water. The reaction was held at 85° C. until a viscosity of about B–C was reached to form a phenol-alkylresorcinol-formaldehyde resin. The product was cooled to room temperature for storage.

The resin produced in accordance with the above procedure was found to have the properties shown in Table V-B.

TABLE V-B

| Property | Value |
| --- | --- |
| Non-volatiles | 51.5 wt. % |
| Water Tolerance | 350 wt. % |
| Gel Time @ 100° C. | about 85 min. |
| Free Formaldehyde | about 0% |
| Final Viscosity | 65 cps |
| Viscosity after one week | 85 cps |
| Viscosity after two weeks | about 100 cps |

EXAMPLE III

TABLE VI-A

| Reactant | Parts By Weight | Concentration |
| --- | --- | --- |
| Phenol | 26.26 | Pure |
| Water | 11.17 | — |
| Caustic (NaOH) | 2.23 | 50 wt. % |
| Formalin | 40.78 | 37 wt. % |
| Total Shale Phenols | 13.69 | 50 wt. % |
| Water | 5.87 | mixture |
| TOTAL | 100.00 | |

In order to produce the resin of Example III, a mixture of the phenol, the first aliquot of water, and the caustic (sodium hydroxide) catalyst was heated to about 65° C., followed by the addition of formalin over a forty minute period at about 65°–70° C. The reaction was continued at 70° C. for an additional thirty minutes after the addition of formalin was completed. The second aliquot of sodium hydroxide was then added and the temperature was increased to about 95° C. The reaction was held at about 90°–95° C. until the viscosity of the reaction mixture reached B–C on the Gardner-Holt viscosity scale.

When this viscosity was reached, the Total Shale Phenols were added with the second aliquot of water. The reaction was held at 85° C. until a measured viscosity of B–C was reached to form a phenol-alkylresorcinol-formaldehyde resin. The product was cooled rapidly to 25° C. for storage.

The resin produced in accordance with Example III, which has a molar ratio of formaldehyde to total phenolics of about 1.38:1, was stable at room temperature and was found to have the properties outlined in Table VI-B below.

TABLE VI-B

| Property | Value |
| --- | --- |
| Non-volatiles | 48.9 wt. % |
| Water Tolerance | 150 wt. % |
| Gel Time @ 100° C. | about 50 min. |
| Free Formaldehyde | about 0% |
| Final Viscosity | 100 cps |
| Viscosity after one week | 125 cps |
| Viscosity after two weeks | 170 cps |

Boiling Water Gel Time ("BWGT"), which can be used as an indicator of resin activity and cure speed (when comparisons of resins are made at a given solids content), helps illustrate the effectiveness of the inventive binder system (e.g., how fast the resin can be cured). As will be understood by those of skill in the art, a higher BWGT indicates a lower reactivity and greater precure resistance. PARF resins prepared in accordance with the above formulations generally have a BWGT of above 80 minutes when tested alone. In comparison, a fast curing phenol-formaldehyde resin used as the curing agent for the inventive PARF resin has a BWGT of about 22 minutes, as shown in Table III. However, when used in combination (i.e., where the PF resin is the curing agent for the PARF resin), at a weight ratio of about 1:1, the inventive binder system has a BWGT of about 10 to about 12 minutes, as indicated by the data in Table VII.

The boiling water gel times of the PARF resins produced in accordance with the invention are generally over about 40 minutes.

Table VII below shows the values obtained for boiling water gel time testing of the resins of Examples I and II, when mixed with a commercially available phenolic resin, GP 122C74, useful as a curing agent. The estimated boiling water gel time for the resin of Example III is also provided.

TABLE VII

BOILING WATER GEL TIMES

| Ratio of Inventive Resin to Commercial Resin, by Weight | Invention Example I | Invention Example II | Invention Example III |
| --- | --- | --- | --- |
| 100% inventive resin | 84.4 minutes | over 85 minutes | about 50 minutes |
| 3:2 | 12.4 minutes | 14.9 minutes | |
| 1:1 | 10.9 minutes | 12.8 minutes | |
| 2:3 | 9.8 minutes | 15.0 minutes | |
| 100% commercial resin | | 22 minutes | |

Table VIII below illustrates the stability of the inventive resins. Satisfactory stability is found if the final viscosity of a resin does not double over the first two weeks of storage at room temperature. All of the resins of Examples I–III were found to be very storage stable.

TABLE VIII

| VISCOSITY | RESIN EXAMPLE I | RESIN EXAMPLE II | RESIN EXAMPLE III |
| --- | --- | --- | --- |
| FINAL AFTER PRODUCTION | 145 cps | 65 cps | 100 cps |
| AFTER ONE WEEK | 180 cps | 85 cps | 125 cps |
| AFTER TWO WEEKS | 200 cps | 100 cps | 170 cps |
| AFTER 18 DAYS | 230 cps | | |

The invention surprisingly provides a phenol-alkylresorcinol-formaldehyde resin of the resol type having a molar ratio of formaldehyde to total phenolics of greater than one, and that is (a) very storage stable, (b) useful by itself as a binder resin, and (c) also reactive with a source of formaldehyde as a curing agent in a binder system.

The inventive resin can be used in the manufacture of various types of wood composites such as those described above. For example, the resins produced by the above process may be used as binders in the production of waferboard. In one embodiment of the invention, in the production of waferboard, a liquid form of the resin is added along with a liquid form of a phenol-formaldehyde resin curing agent to wood flakes or wafers in a mixing vessel, followed by mechanical blending of the ingredients. Alternatively, the powder form of this two-component binder system may be added to the wood wafers as a one-component resin. The wood wafers may, for example, have a moisture content of less than about 20 wt.%. Optionally, other materials such as waxes (to improve water resistance and for sizing properties) may be added to the waferboard, as is known in the art.

The mixed ingredients are formed into a mat and then cured under heat and pressure to form waferboard. As will be apparent to one of ordinary skill in the art, desirable pressing temperatures vary according to several factors, including the following: the thickness of the board, the type of cellulosic material being pressed, the moisture content of the cellulosic material, the press time, and the type of resin which is utilized. However, for most applications, the press temperature is generally between about 200° F. and 500° F., and preferably greater than 300° F. For the production of waferboard as in the above example, the press temperature is preferably greater than 400° F.

The moisture content of the cellulosic material (known as "furnish moisture content") is one factor which controls the core temperature of the mat which can be achieved under given press conditions. Because the inventive resin system is very fast curing, one resulting advantage is that the binder system is able to be cured at lower core temperatures than fast curing phenol-formaldehyde resins at a given furnish moisture content, or at a furnish higher moisture content at a given press temperature.

Similarly, the inventive resin is useful in processes for the manufacture of fiberboard. After one of the mat formation stages described above, the mat is placed in a press where the mat is consolidated under heat and pressure to produce a molded wood composite. The inventive resin will require platen temperatures and press cycles which are typical for other phenolic resins. By way of example only, the pressing temperatures for fiberboard production can be in the range of about 250° F. to about 550° F. (about 120° C. to about 288° C.).

The press pressure can be in the range of about 400 psi to about 850 psi, for example. The press time can be in the range of about 20 seconds to about 20 minutes (and more preferably in the range of about 30 seconds to 90 seconds). However, it should be understood that these conditions are variable depending upon the desired final product and that those of skill in the art will be able to make modifications based upon the desired final product.

When exposed to this heat and pressure, the thermosetting resin will be cured and the mat will be compressed into an integral consolidated structure. After the molded wood composite has been pressed, it can be transported for shipment or sale, or for coating, gluing or other finishing to complete a desired product.

It has been found that with the inventive binder system, the free formaldehyde emission out of the press is much lower than with conventional fast-curing phenolic-formaldehyde resins due to the reduced lower formaldehyde content when the PARF prepolymer is combined with the phenolic resin curing agent, as described above. This is very beneficial, particularly for commercial operations, due to the known disadvantages of the presence of formaldehyde.

TESTING OF CELLULOSIC COMPOSITE SAMPLES

In order to evaluate the resins of the invention, various products incorporating the resins of the invention were produced and tested. Resins were evaluated by incorporation into a cellulosic composite board product useful in the production of shingles. All of the tested boards included two layers: (a) a fiberboard overlay layer with (b) a waferboard (or flake) substrate or underlay.

Except as noted, the boards made with each type of resin were produced under the same conditions. In production of the boards, the binders were mixed in a blender and laid into a fiber mat over a flake mat. The materials were then pressed simultaneously over a cook time of either 135 seconds or 150 seconds.

In producing the boards of the invention, the following arrangement was used. In the fiberboard overlay layer, the inventive resin of Example III above was mixed with wood fiber. In the waferboard substrate, a 1:1 weight ratio blend of the inventive resin of Example I and a commercial phenol-formaldehyde resin (as a curing agent) were mixed with wood flakes.

For the control boards, the following arrangement was used. In the fiberboard overlay layer a commercial phenol resin was mixed with wood fiber. In the waferboard substrate, a 1:1 weight ratio blend of a phenol-resorcinol-formaldehyde resin (having a molar ratio of formaldehyde to total phenolics of greater than one) and a commercial phenol-formaldehyde resin (GP 122C74) was mixed with wood flakes.

The following table summarizes the resins and furnish moisture contents of the fillers used in each of the control and inventive boards.

TABLE IX

| LAYER | RESIN | FURNISH MOISTURE CONTENT |
|---|---|---|
| Control-Overlay | commercial phenol-formaldehyde (GP 99C28) - 8 weight percent | 9.3% (fiber) |
| Control-Flake | (a) resorcinol-modified phenol-formaldehyde and (b) commercial phenol-formaldehyde (GP 122C74, curing agent) - 5.5 weight percent | 8.2% (fines) and 8.3% (flakes) |
| Invention-Overlay | resin of Example III (molar ratio of formaldehyde to total phenolics of about 1.38) - 8 weight percent | 9.3% (fiber) |
| Invention-Flake | (a) resin of Example I (molar ratio of formaldehyde to total phenolics of about 1.38) and (b) commercial phenol-formaldehyde resin (GP 122C74, curing agent) - 5.5 weight percent | 8.5% (fines) and 7.5% (flakes) |

For each resin, three boards were made with a cook time of 150 seconds and two boards were made with a cook time of 130 seconds. Cook time is defined as the time under full pressure and elevated temperature. The products were pressed at a platen temperature of about 380° F. The target specific gravity for all of the boards was 0.7 g/cm³. Wax was added to the composition of all the boards at about 2 percent. The resin content was (a) about 8 weight percent in the overlay layer and (b) about 5.5 weight percent in the second layer.

Seven samples were taken from each produced board and evaluated for internal bond values; two samples were evaluated for a 24-hour soak test; four samples were evaluated for percent boil swell. The results of the internal bond testing are shown in Table X; the results of the 24-hour soak testing are shown in Table XI; and the results of the boil swell tests are shown in Table XII.

The internal bond test is a standardized test measuring the strength of the board product. The 24-hour soak test, is a standardized test wherein the board is placed in water for a twenty-four hour period. The increase in caliper and weight are measured in order to determine the influence of water on the board product.

In the one hour board caliper swell test, the boards are boiled for one hour, followed by measuring the amount of swelling that has taken place.

TABLE X

| BOARD NO. | RESIN | COOK TIME [Seconds] | CALIPER [Inches] | WEIGHT [Grams] | SPECIFIC GRAVITY [g/cm²] | LOAD [lbs.] | INTERNAL BOND [lbs./in²] |
|---|---|---|---|---|---|---|---|
| 1 | Control | 150 | 0.4110 | 18.58 | 0.69 | 330 | 83 |
| 1 | Control | 150 | 0.4141 | 19.44 | 0.72 | 320 | 80 |
| 1 | Control | 150 | 0.4145 | 19.45 | 0.72 | 350 | 88 |
| 1 | Control | 150 | 0.4125 | 19.04 | 0.70 | 330 | 83 |
| 1 | Control | 150 | 0.4075 | 19.07 | 0.71 | 360 | 90 |
| 1 | Control | 150 | 0.4184 | 18.31 | 0.67 | 340 | 85 |
| 1 | Control | 150 | 0.4099 | 19.13 | 0.71 | 300 | 75 |
| 2 | Control | 150 | 0.4164 | 19.34 | 0.71 | 340 | 85 |
| 2 | Control | 150 | 0.4220 | 18.68 | 0.68 | 250 | 63 |
| 2 | Control | 150 | 0.4207 | 19.56 | 0.71 | 330 | 83 |
| 2 | Control | 150 | 0.4220 | 19.80 | 0.72 | 300 | 75 |
| 2 | Control | 150 | 0.4301 | 19.19 | 0.68 | 260 | 65 |
| 2 | Control | 150 | 0.4186 | 18.34 | 0.67 | 300 | 75 |
| 2 | Control | 150 | 0.4233 | 19.63 | 0.71 | 280 | 70 |
| 3 | Control | 150 | 0.4228 | 19.39 | 0.70 | 270 | 68 |
| 3 | Control | 150 | 0.4252 | 19.32 | 0.69 | 340 | 85 |
| 3 | Control | 150 | 0.4202 | 18.99 | 0.69 | 390 | 98 |
| 3 | Control | 150 | 0.4319 | 20.09 | 0.71 | 250 | 63 |
| 3 | Control | 150 | 0.4285 | 19.86 | 0.71 | 340 | 85 |
| 3 | Control | 150 | 0.4237 | 18.41 | 0.66 | 320 | 80 |
| 3 | Control | 150 | 0.4241 | 19.95 | 0.72 | 160 | 40 |
| 4 | Control | 135 | 0.4215 | 20.16 | 0.73 | 220 | 55 |
| 4 | Control | 135 | 0.4178 | 19.44 | 9.71 | 279 | 68 |
| 4 | Control | 135 | 0.4212 | 19.62 | 0.71 | 340 | 85 |
| 4 | Control | 135 | 0.4193 | 19.41 | 0.71 | 380 | 95 |
| 4 | Control | 135 | 0.4233 | 20.26 | 0.73 | 230 | 58 |
| 4 | Control | 135 | 0.4218 | 19.48 | 0.70 | 190 | 48 |
| 4 | Control | 135 | 0.4163 | 18.47 | 0.68 | 380 | 95 |
| 5 | Control | 135 | 0.4308 | 20.08 | 0.71 | 270 | 68 |
| 5 | Control | 135 | 0.4225 | 19.34 | 0.70 | 300 | 75 |
| 5 | Control | 135 | 0.4215 | 20.16 | 0.73 | 350 | 88 |
| 5 | Control | 135 | 0.4245 | 18.49 | 0.66 | 270 | 68 |
| 5 | Control | 135 | 0.4185 | 19.29 | 0.70 | 190 | 48 |
| 5 | Control | 135 | 0.4142 | 19.09 | 0.70 | 350 | 88 |
| 5 | Control | 135 | 0.4251 | 19.46 | 0.70 | 290 | 73 |
| 6 | Invention | 150 | 0.4027 | 19.35 | 0.73 | 330 | 83 |
| 6 | Invention | 150 | 0.4153 | 19.89 | 0.73 | 330 | 83 |
| 6 | Invention | 150 | 0.4259 | 20.24 | 0.72 | 290 | 73 |
| 6 | Invention | 150 | 0.4128 | 19.15 | 0.71 | 340 | 85 |
| 6 | Invention | 150 | 0.4088 | 19.18 | 0.72 | 420 | 105 |
| 6 | Invention | 150 | 0.4228 | 19.29 | 0.70 | 270 | 68 |
| 6 | Invention | 150 | 0.4153 | 20.67 | 0.76 | 350 | 88 |
| 7 | Invention | 150 | 0.4223 | 19.53 | 0.71 | 360 | 90 |
| 7 | Invention | 150 | 0.4138 | 18.75 | 0.69 | 340 | 85 |
| 7 | Invention | 150 | 0.4199 | 20.26 | 0.74 | 290 | 73 |
| 7 | Invention | 150 | 0.4192 | 19.35 | 0.70 | 380 | 95 |
| 7 | Invention | 150 | 0.4177 | 19.97 | 0.73 | 460 | 115 |
| 7 | Invention | 150 | 0.4207 | 19.58 | 0.71 | 380 | 95 |
| 7 | Invention | 150 | 0.4177 | 19.50 | 0.71 | 270 | 68 |
| 8 | Invention | 150 | 0.4169 | 19.44 | 0.71 | 290 | 73 |
| 8 | Invention | 150 | 0.4177 | 19.82 | 0.72 | 370 | 93 |
| 8 | Invention | 150 | 0.4210 | 19.71 | 0.71 | 300 | 75 |
| 8 | Invention | 150 | 0.4298 | 20.28 | 0.72 | 370 | 93 |
| 8 | Invention | 150 | 0.4269 | 20.21 | 0.72 | 370 | 93 |
| 8 | Invention | 150 | 0.4226 | 20.12 | 0.73 | 330 | 83 |
| 8 | Invention | 150 | 0.4160 | 19.69 | 0.72 | 370 | 93 |
| 9 | Invention | 135 | 0.4158 | 19.69 | 0.72 | 410 | 103 |
| 9 | Invention | 135 | 0.4149 | 18.15 | 0.67 | 330 | 83 |
| 9 | Invention | 135 | 0.4202 | 19.47 | 0.71 | 330 | 83 |

TABLE X-continued

| BOARD NO. | RESIN | COOK TIME [Seconds] | CALIPER [Inches] | WEIGHT [Grams] | SPECIFIC GRAVITY [g/cm$^2$] | LOAD [lbs.] | INTERNAL BOND [lbs./in$^2$] |
|---|---|---|---|---|---|---|---|
| 9 | Invention | 135 | 0.4195 | 18.28 | 0.66 | 300 | 75 |
| 9 | Invention | 135 | 0.4305 | 19.90 | 0.70 | 2D0 | 50 |
| 9 | Invention | 135 | 0.4217 | 20.14 | 0.73 | 310 | 78 |
| 9 | Invention | 135 | 0.4252 | 20.94 | 0.75 | 200 | 50 |
| 10 | Invention | 135 | 0.4140 | 18.91 | 0.70 | 390 | 98 |
| 10 | Invention | 135 | 0.4163 | 19.18 | 0.70 | 350 | 88 |
| 10 | Invention | 135 | 0.4237 | 19.24 | 0.69 | 400 | 100 |
| 10 | Invention | 135 | 0.4123 | 19.39 | 0.72 | 420 | 105 |
| 10 | Invention | 135 | 0.4183 | 18.97 | 0.69 | 340 | 85 |
| 10 | Invention | 135 | 0.4148 | 18.79 | 0.69 | 400 | 100 |
| 10 | Invention | 135 | 0.4153 | 18.68 | 0.69 | 360 | 90 |

TABLE XI

24 HOUR CALIPER SWELL AND WATER ABSORPTION

| BOARD NO. | RESIN | COOK TIME [sec] | PERCENT CALIPER SWELL | PERCENT WATER ABSORPTION | SPECIFIC GRAVITY |
|---|---|---|---|---|---|
| 1 | Control | 150 | 7.2 | 22.5 | 0.74 |
| 1 | Control | 150 | 8.3 | 24.9 | 0.73 |
| 2 | Control | 150 | 5.7 | 22.5 | 0.74 |
| 2 | Control | 150 | 9.7 | 30.6 | 0.73 |
| 3 | Control | 150 | 7.8 | 24.4 | 0.70 |
| 3 | Control | 150 | 7.9 | 23.1 | 0.73 |
| 4 | Control | 135 | 8.3 | 24.6 | 0.72 |
| 4 | Control | 135 | 8.8 | 24.7 | 0.72 |
| 5 | Control | 135 | 9.5 | 23.5 | 0.73 |
| 5 | Control | 135 | 7.5 | 23.8 | 0.72 |
| 6 | Invention | 150 | 9.0 | 27.7 | 0.72 |
| 6 | Invention | 150 | 9.5 | 27.6 | 0.71 |
| 7 | Invention | 150 | 9.4 | 23.8 | 0.74 |
| 7 | Invention | 150 | 7.8 | 25.0 | 0.71 |
| 8 | Invention | 150 | 10.0 | 28.9 | 0.70 |
| 8 | Invention | 150 | 8.8 | 26.4 | 0.72 |
| 9 | Invention | 135 | 9.0 | 27.6 | 0.72 |
| 9 | Invention | 135 | 9.1 | 26.8 | 0.73 |
| 10 | Invention | 135 | 9.2 | 28.0 | 0.74 |
| 10 | Invention | 135 | 10.4 | 27.7 | 0.73 |

TABLE XII

BOIL SWELL TEST

| BOARD NO. | RESIN | ORIGINAL CALIPER [inches] | ORIGINAL WEIGHT [grams] | FINAL CALIPER [inches] | FINAL WEIGHT [grams] | PERCENT CALIPER SWELL | SPECIFIC GRAVITY [g/cm$^3$] |
|---|---|---|---|---|---|---|---|
| 1 | Control | 0.4138 | 20.10 | 0.5653 | 37.62 | 36.6 | 0.74 |
| 1 | Control | 0.4157 | 20.23 | 0.5662 | 37.36 | 36.2 | 0.74 |
| 1 | Control | 0.4132 | 18.45 | 0.5713 | 38.67 | 38.3 | 0.68 |
| 1 | Control | 0.4101 | 18.34 | 0.5612 | 39.22 | 36.8 | 0.68 |
| 2 | Control | 0.4245 | 20.61 | 0.6296 | 40.50 | 48.3 | 0.74 |
| 2 | Control | 0.4198 | 20.46 | 0.6184 | 42.27 | 47.3 | 0.74 |
| 2 | Control | 0.4232 | 19.00 | 0.6241 | 38.11 | 47.5 | 0.68 |
| 2 | Control | 0.4175 | 18.71 | 0.5824 | 38.73 | 39.5 | 0.68 |
| 3 | Control | 0.4191 | 18.94 | 0.6164 | 40.22 | 47.1 | 0.69 |
| 3 | Control | 0.4202 | 18.99 | 0.5671 | 37.02 | 35.0 | 0.69 |
| 3 | Control | 0.4249 | 19.01 | 0.6217 | 40.50 | 46.3 | 0.68 |
| 3 | Control | 0.4180 | 20.64 | 0.5949 | 39.13 | 42.3 | 0.75 |
| 4 | Control | 0.4161 | 19.08 | 0.5658 | 35.62 | 36.0 | 0.70 |
| 4 | Control | 0.4200 | 18.93 | 0.5764 | 37.85 | 37.2 | 0.69 |
| 4 | Control | 0.4185 | 20.13 | 0.6081 | 38.81 | 45.3 | 0.73 |
| 4 | Control | 0.4150 | 20.17 | 0.6171 | 39.61 | 48.7 | 0.74 |
| 5 | Control | 0.4282 | 18.87 | 0.6342 | 40.94 | 48.1 | 0.67 |
| 5 | Control | 0.4190 | 20.41 | 0.6436 | 40.81 | 53.6 | 0.74 |

TABLE XII-continued

BOIL SWELL TEST

| BOARD NO. | RESIN | ORIGINAL CALIPER [inches] | ORIGINAL WEIGHT [grams] | FINAL CALIPER [inches] | FINAL WEIGHT [grams] | PERCENT CALIPER SWELL | SPECIFIC GRAVITY [g/cm³] |
|---|---|---|---|---|---|---|---|
| 5 | Control | 0.4186 | 20.83 | 0.6009 | 39.25 | 43.5 | 0.76 |
| 5 | Control | 0.4232 | 18.89 | 0.6335 | 38.69 | 49.7 | 0.68 |
| 6 | Invention | 0.4063 | 18.34 | 0.5298 | 36.38 | 30.4 | 0.69 |
| 6 | Invention | 0.4183 | 20.24 | 0.5771 | 38.11 | 38.0 | 0.74 |
| 6 | Invention | 0.4125 | 18.50 | 0.5538 | 37.10 | 34.3 | 0.68 |
| 6 | Invention | 0.4228 | 20.57 | 0.5897 | 38.96 | 39.5 | 0.74 |
| 7 | Invention | 0.4113 | 18.79 | 0.5360 | 37.38 | 30.3 | 0.70 |
| 7 | Invention | 0.4231 | 18.90 | 0.5625 | 37.18 | 32.9 | 0.68 |
| 7 | Invention | 0.4096 | 20.14 | 0.5499 | 38.49 | 34.3 | 0.75 |
| 7 | Invention | 0.4192 | 20.49 | 0.5812 | 37.14 | 38.6 | 0.75 |
| 8 | Invention | 0.4253 | 21.01 | 0.5643 | 38.42 | 32.7 | 0.75 |
| 8 | Invention | 0.4210 | 20.38 | 0.5598 | 37.66 | 33.0 | 0.74 |
| 8 | Invention | 0.4217 | 18.59 | 0.5680 | 35.76 | 34.7 | 0.67 |
| 8 | Invention | 0.4336 | 19.82 | 0.5860 | 38.17 | 35.1 | 0.70 |
| 9 | Invention | 0.4191 | 19.15 | 0.5568 | 36.27 | 32.9 | 0.70 |
| 9 | Invention | 0.4146 | 18.93 | 0.5646 | 36.62 | 36.2 | 0.70 |
| 9 | Invention | 0.4236 | 20.33 | 0.5853 | 39.52 | 38.2 | 0.73 |
| 9 | Invention | 0.4128 | 20.51 | 0.5948 | 39.30 | 44.1 | 0.76 |
| 10 | Invention | 0.4271 | 19.25 | 0.5863 | 39.21 | 37.3 | 0.69 |
| 10 | Invention | 0.4209 | 20.86 | 0.6097 | 39.16 | 44.9 | 0.76 |
| 10 | Invention | 0.4218 | 18.92 | 0.5579 | 36.64 | 32.3 | 0.68 |
| 10 | Invention | 0.4307 | 20.67 | 0.6449 | 41.65 | 49.7 | 0.73 |

The results show that the inventive resin can perform well without the addition of an additional source of aldehyde or other curing agent.

Generally, the internal bond strength values of wood composites incorporating the inventive binder PARF/PF system are at least as good as the control resins, for given cure times. However, the inventive resin can replace the resorcinol used in a phenol-resorcinol-formaldehyde resin with a much cheaper raw material, e.g., the "Total Shale Phenols" or the "Alkyres."

Other properties (such as water absorption, thickness swell, one hour boil caliper swell) are much better for the inventive binder system, even at the shorter press times, than for known phenol-formaldehyde resins. The water absorption and thickness swell tests are performed by soaking a board for twenty-four hours at room temperature. Further, as stated above, free formaldehyde emission out of the press is significantly lower with the inventive resin system than with conventional fast-curing phenol-formaldehyde resins.

The foregoing detailed description is given for clearness of understanding only, and no unnecessary limitations should be understood therefrom, as modifications within the scope of the invention will be apparent to those skilled in the art.

I claim:

1. A method of preparing a modified phenol-aldehyde resole resin, comprising:
   (a) reacting a phenolic compound and an aldehyde at a molar ratio of aldehyde to phenolic compound in a range of about 1.2:1 to about 2.0:1, said reaction taking place in the presence of an alkaline catalyst present in an amount of about 0.1 to about 0.2 moles catalyst per mole of said phenolic compound; and
   (b) reacting a modifier comprising an alkylresorcinol compound with the product of step (a) wherein the molar ratio of said aldehyde to the total of said phenolic compound and said alkylresorcinol compound is greater than about 1:1, to produce said resole resin.

2. The method of claim 1, wherein:
said step (b) comprises reacting a mixture of at least two alkylresorcinol compounds with the product of step (a).

3. The method of claim 1, wherein:
said modifier comprises 5-ethylresorcinol.

4. The method of claim 1, wherein:
said molar ratio of said aldehyde to the total of said phenolic compound and said modifier is about 1:1 to about 1.8:1.

5. The method of claim 4, wherein:
said molar ratio of said aldehyde to the total of said phenolic compound and said modifier is about 1:1 to about 1.4:1.

6. The method of claim 1, wherein:
the molar ratio of said aldehyde to phenolic compound is in the range of about 1.2:1 to about 2.2:1.

7. The method of claim 1, wherein:
said molar ratio of aldehyde to said phenolic compound is about 1.3:1 to about 1.6:1.

8. The method of claim 1, wherein:
said molar ratio of said phenolic compound to said modifier is about 5:1 to about 10:1.

9. The method of claim 1, wherein:
said modified phenol-aldehyde resin is combined with a curing agent comprising a source of an aldehyde to form a binder system.

10. The method of claim 9, wherein:
said curing agent is selected from the group consisting of phenol-formaldehyde resins, urea-formaldehyde resins, melamine-formaldehyde resins, hexamethylenetetramine, formaldehyde, and paraformaldehyde.

11. The method of claim 9, wherein:
said curing agent comprises a phenol-formaldehyde resin.

12. The method of claim 11, wherein:
the weight ratio of said phenol-aldehyde resin to said modified phenol-aldehyde resin is about 0.25:1 to about 4.0:1.

13. The method of claim 11, wherein:
each of said modified phenol-aldehyde resin and said curing agent is in the form of a liquid.

14. The method of claim 11, wherein:
the weight ratio of said phenol-formaldehyde resin to said modified phenol-aldehyde resin is about 0.6:1 to about 1.5:1.

15. A method of producing a modified phenol-formaldehyde resin, comprising:
(a) reacting a phenolic compound comprising a phenol or a phenol derivative and an aldehyde at a molar ratio of aldehyde to phenolic compound of about 1.2:1 to about 2.0:1, said reaction taking place in the presence of an alkaline catalyst present in an amount of about 0.1 to about 0.2 moles catalyst per mole of said phenolic compound; and
(b) reacting a modifier comprising an alkyl resorcinol compound with the product of step (a) wherein (1) the molar ratio of said phenolic compound to said modifier is about 1:1 to about 10:1 and (2) the molar ratio of said aldehyde to the total of said phenolic compound and said modifier is greater than about 1:1.

16. A resole resin made by the method of any one of claims 1, 2, 4, 6, 9, 11, 12, 14, or 15.

17. A method of preparing a binder system useful in the production of a cellulosic composite, comprising:
(a) reacting a phenolic compound and an aldehyde at a molar ratio of aldehyde to phenolic compound in a range of about 1.2:1 to about 2.0:1, said reaction taking place in the presence of an alkaline catalyst present in an amount of about 0.1 to about 0.2 moles catalyst per mole of said phenolic compound;
(b) reacting a modifier comprising an alkylresorcinol compound with the product of step (a) at a molar ratio of aldehyde to total phenolics of greater than about 1:1, to form a modified phenol-aldehyde resole resin; and
(c) combining said modified phenol-aldehyde resin with a curing agent which comprises an organic resin comprising an aldehyde, to form said binder system.

18. The method of claim 17, wherein:
said organic resin curing agent comprises a phenol-formaldehyde resin, and wherein the weight ratio of said phenol-formaldehyde resin to said modified phenol-aldehyde resin is about 0.25:1 to about 4.0:1.

19. The method of claim 18, wherein:
the weight ratio of said phenol-formaldehyde resin to said modified phenol-aldehyde resin is about 0.6:1 to about 1.5:1.

20. The method of claim 17, wherein:
(d) the molar ratio of said aldehyde of step (a) to said phenolic compound is about 1.2:1 to about 2.0:1;
(e) said alkaline catalyst is present in an amount of about 0.1 to about 0.2 moles per mole of said phenolic compound; and
(f) the molar ratio of said phenolic compound to said modifier is about 1:1 to about 10:1.

21. A binder system made by the method of any one of claims 17–20.

22. A method of producing a cellulosic composite, comprising:
(a) reacting a phenolic compound comprising phenol or a phenol derivative and an aldehyde at a molar ratio of aldehyde to phenolic compound in a range of about 1.2:1 to about 2.0:1, said reaction taking place in the presence of an alkaline catalyst present in an amount of about 0.1 to about 0.2 moles catalyst per mole of said phenolic compound;
(b) reacting a modifier comprising an alkylresorcinol compound with the product of step (a) at a molar ratio of aldehyde to total phenolics of greater than about 1:1, to form a modified phenol-aldehyde resole resin;
(c) combining said modified phenol-aldehyde resin with a curing agent which comprises an organic resin comprising an aldehyde to form a binder system;
(d) combining said binder system with a cellulosic filler;
(e) forming the product of step (d) into a mat; and
(f) consolidating said mat under heat to form said cellulosic composite.

23. The method of claim 22, wherein:
said mat has a moisture content of less than about 20 wt. %.

24. A cellulosic composite made by the method of claim 22 or claim 23.

25. A method of producing a cellulosic composite, comprising:
(a) reacting a phenolic compound comprising phenol or a phenol derivative and an aldehyde at a molar ratio of aldehyde to phenolic compound of about 1.2:1 to about 2.0:1, said reaction taking place in the presence of an alkaline catalyst present in an amount of about 0.1 to about 0.2 moles catalyst per mole of said phenolic compound; and
(b) reacting a modifier comprising an alkylresorcinol compound with the product of step (a) wherein (1) the molar ratio of said phenolic compound to said modifier is about 1:1 to about 10:1 and (2) the molar ratio of said aldehyde to the total of said phenolic compound and said modifier is greater than about 1:1;
(c) combining the product of step (b) with a phenol-aldehyde resin and a cellulosic filler;
(d) forming the product of step (c) into a mat; and
(e) pressing said mat under heat to form said cellulosic composite.

26. The method of claim 25, wherein: said modifier comprises 5-ethylresorcinol.

27. A method for the production of plywood, comprising:
(a) reacting a phenolic compound comprising phenol or a phenol derivative and an aldehyde at a molar ratio of aldehyde to phenolic compound in a range of about 1.2:1 to about 2.0:1, said reaction taking place in the presence of an alkaline catalyst present in an amount of about 0.1 to about 0.2 moles catalyst per mole of said phenolic compound;
(b) reacting a modifier comprising an alkylresorcinol compound with the product of step (a) to form a modified phenol-aldehyde resole resin;
(c) combining said modified phenol-aldehyde resin with a curing agent which comprises a phenolic resin to form a binder system;
(d) placing said binder system on a wood panel;
(e) curing the product of step (d) under heat and pressure.

28. The method of claim 1, wherein:
the molar ratio of said phenolic compound to said modifier is in a range of about 1:1 to about 10:1.

29. A method of preparing a modified phenol-aldehyde resole resin, comprising:
(a) reacting a phenolic compound comprising phenol or a phenol derivative and an aldehyde at a molar ratio of aldehyde to phenolic compound in a range of about 1.2:1 to about 2.0:1, said reaction taking place in the presence of an alkaline catalyst; and
(b) reacting a modifier comprising an alkylresorcinol compound with the product of step (a) wherein the molar ratio of said aldehyde to the total of said phenolic compound and said alkylresorcinol compound is greater than about 1:1, to produce said resole resin.

* * * * *